US010748525B2

(12) United States Patent
Abuelsaad et al.

(10) Patent No.: US 10,748,525 B2
(45) Date of Patent: Aug. 18, 2020

(54) MULTI-MODAL DIALOG AGENTS REPRESENTING A LEVEL OF CONFIDENCE IN ANALYSIS

(71) Applicant: International Business Machines Corporation, Armonk, NY (US)

(72) Inventors: Tamer Abuelsaad, Armonk, NY (US); Ravindranath Kokku, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/837,070

(22) Filed: Dec. 11, 2017

(65) Prior Publication Data

US 2019/0180737 A1    Jun. 13, 2019

(51) Int. Cl.
*G10L 15/22* (2006.01)
*G10L 25/90* (2013.01)
(Continued)

(52) U.S. Cl.
CPC .......... *G10L 15/1815* (2013.01); *G06F 3/167* (2013.01); *G06N 5/00* (2013.01);
(Continued)

(58) Field of Classification Search
CPC . G10L 13/033; G10L 13/0335; G10L 13/043; G10L 13/10; G10L 15/22;
(Continued)

(56) References Cited

U.S. PATENT DOCUMENTS

| 8,448,258 B2 | 5/2013 | Abuelsaad |
| 8,694,522 B1 * | 4/2014 | Pance ................. G06F 16/9535 |
| | | 707/758 |

(Continued)

FOREIGN PATENT DOCUMENTS

CA        2774466 A1     3/2011

OTHER PUBLICATIONS

Eady, Stephen J., et al. "Speech intonation and focus location in matched statements and questions." The Journal of the Acoustical Society of America 80.2, Aug. 1986, pp. 402-415. (Year: 1986).*

(Continued)

*Primary Examiner* — James S Wozniak
(74) *Attorney, Agent, or Firm* — Daniel Morris; Otterstedt, Wallace & Kammer, LLP (57) ABSTRACT

A multi-modal dialog apparatus includes a memory embodying computer executable instructions; and at least one processor, coupled to the memory, and operative by the computer executable instructions. More specifically, the processor is operative by the computer executable instructions to facilitate receiving a remark from a user; passing the remark to an intelligent system; receiving a response and a level of confidence from the intelligent system; portraying the response to the user via an equivocal persona in case the level of confidence is less than a pre-determined threshold value; and portraying the response to the user via an authoritative persona in case the level of confidence equals or exceeds the pre-determined threshold value.

19 Claims, 7 Drawing Sheets

(51) Int. Cl.
*G06F 3/16* (2006.01)
*G06N 5/00* (2006.01)
*G10L 13/033* (2013.01)
*G10L 13/04* (2013.01)
*G06F 16/248* (2019.01)
*G06F 16/432* (2019.01)
*G10L 13/10* (2013.01)
*G10L 15/18* (2013.01)
*G10L 15/19* (2013.01)
*G10L 15/08* (2006.01)

(52) U.S. Cl.
CPC ............ *G10L 13/033* (2013.01); *G10L 15/19* (2013.01); *G10L 15/22* (2013.01); *G10L 25/90* (2013.01); *G06F 16/248* (2019.01); *G06F 16/434* (2019.01); *G10L 13/0335* (2013.01); *G10L 13/043* (2013.01); *G10L 13/10* (2013.01); *G10L 2015/088* (2013.01)

(58) Field of Classification Search
CPC .. G06F 17/30991; G06F 16/248; G06F 3/167; G06N 3/006
USPC ............. 704/9, 260, 266, 270; 707/723, 728
See application file for complete search history.

(56) References Cited

U.S. PATENT DOCUMENTS

| | | | |
|---|---|---|---|
| 8,725,728 | B1 | 5/2014 | King |
| 9,436,740 | B2 | 9/2016 | Fisher |
| 9,449,093 | B2* | 9/2016 | Gur .................. G06F 17/30389 |
| 2007/0294229 | A1 | 12/2007 | Au |
| 2008/0172359 | A1* | 7/2008 | Lundell .................. G10L 15/22 |
| 2012/0052476 | A1 | 3/2012 | Graesser |
| 2012/0306741 | A1* | 12/2012 | Gupta ................. G06F 3/04815 345/156 |
| 2013/0029308 | A1 | 1/2013 | Graesser |
| 2013/0050199 | A1* | 2/2013 | Chavez ................ G06Q 10/101 345/419 |
| 2013/0311506 | A1* | 11/2013 | Taubman .......... G06F 16/90335 707/769 |
| 2015/0026163 | A1* | 1/2015 | Haggar ............... G06F 16/3329 707/723 |
| 2015/0099257 | A1* | 4/2015 | Kozloski ............. G06F 17/2785 434/362 |
| 2015/0261859 | A1* | 9/2015 | Isensee ............. G06F 17/30864 707/723 |
| 2015/0278253 | A1* | 10/2015 | Ahuja ................. G06F 16/5866 707/731 |
| 2015/0331935 | A1* | 11/2015 | Jamrog ................... G06F 16/35 707/722 |
| 2016/0063989 | A1* | 3/2016 | Deleeuw ................ G10L 15/22 345/473 |
| 2016/0077794 | A1* | 3/2016 | Kim ........................ G06F 3/167 704/275 |
| 2016/0098936 | A1* | 4/2016 | Solomon ............... G09B 5/065 434/276 |
| 2016/0110415 | A1* | 4/2016 | Clark ................... G06F 16/332 707/774 |
| 2017/0180219 | A1 | 6/2017 | Abuelsaad |
| 2017/0180808 | A1* | 6/2017 | Kageyama ......... H04N 21/4751 |
| 2017/0358305 | A1* | 12/2017 | Kudurshian ...... G06F 17/30746 |
| 2018/0075845 | A1* | 3/2018 | Kochura ............. G10L 15/1807 |
| 2018/0096058 | A1* | 4/2018 | Anderson ............... G06F 40/00 |
| 2018/0131645 | A1* | 5/2018 | Magliozzi ............ G06Q 10/107 |
| 2018/0314684 | A1* | 11/2018 | Johnson, Jr. .......... G06F 17/279 |
| 2018/0336715 | A1* | 11/2018 | Rickwald ................ G06T 13/40 |

OTHER PUBLICATIONS

Gouin, Denis, et al. "Human-computer interaction with an intelligence virtual analyst." Proc. Knowledge Systems for Coalition Operations, Pensacola, FL, US, Feb. 2012, pp. 1-5. (Year: 2012).*
Lasarcyk, Eva, et al. "Do prosodic cues influence uncertainty perception in articulatory speech synthesis?." Seventh ISCA Workshop on Speech Synthesis, Sep. 2010, pp. 230-235. (Year: 2010).*
Marsi, Erwin, et al. "Expressing uncertainty with a talking head in a multimodal question-answering system." MOG 2007 Workshop on Multimodal Output Generation. Jan. 2007, pp. 1-12. (Year: 2007).*
Smith, Vicki L., et al. "On the course of answering questions." Journal of memory and language 32.1, Feb. 1993, pp. 25-38. (Year: 1993).*
Swerts, Marc, et al. "Audiovisual cues to uncertainty." ISCA Tutorial and Research Workshop on Error Handling in Spoken Dialogue Systems. 2003, pp. 1-6. (Year: 2003).*
Székely, Eva, et al. "Synthesising uncertainty: the interplay of vocal effort and hesitation disfluencies." Proc. Interspeech 2017, Aug. 2017, pp. 804-808. (Year: 2017).*
Wollermann, Charlotte, et al. "Effects of exhaustivity and uncertainty on audiovisual focus production." AVSP. Sep. 2009, pp. 145-150. (Year: 2009).*
Wollermann, Charlotte, et al. "Modeling and perceiving of different degrees of certainty in articulatory speech synthesis." Aug. 2007, pp. 40-45. (Year: 2007).*
Anonymous, "Face with Stuck-out Tongue and Winking Eye," https://emojipedia.org/face-with-stuck-out-tongue-and-winking-eye retrieved from Archive.org on Sep. 17, 2019; page captured Dec. 2015, pp. 1-7. (Year: 2015).*
Peter Mell, "The NIST Definition of Cloud Computing". Special Publication 800-145. Sep. 2011, pp. 1-7.
John E. Kelly III, "Computing, cognition, and the future of knowing", IBM Corp. Oct. 2015. pp. 1-7.
Anonymous, "A System and Method for Representing Content Confidence in a Document", IP.com. Mar. 5, 2013. IPCOM000225778D pp. 1-7.
Chris Reed and Glenn Rowe, "Araucaria: Software for Argument Analysis, Diagramming and Representation", Univ. Dundee. Jul. 13, 2004. pp. 1-19.
Eric N. Forsyth and Craig H. Martell, "Lexical and Discourse Analysis of Online Chat Dialog", U.S. Naval Postgraduate School. Jan. 2007. pp. 1-9.
Michael Johnston et al., "Match: An Architecture for Multimodal Dialogue Systems", Proc. 40th ACL. Jul. 2002. pp. 376-383.

* cited by examiner

MULTI-MODAL DIALOG AGENTS REPRESENTING A LEVEL OF CONFIDENCE IN ANALYSIS

BACKGROUND

The present invention relates to the electrical, electronic, and computer arts, and more specifically, to automated dialog agents.

Automated dialog agents can be used to present the results of a computer analytics system, for example, the results of analytics conducted by a neural network or by another form of intelligent system. A typical dialog agent enacts a persona that helps a user of the computer analytics system feel comfortable with the results being presented. Dialog agents may be implemented in text or audio. Among other applications, automated dialog agents can be used in early childhood education to teach children about objects or situations that are novel to the child and that may also be novel to the intelligent system that supports an automated dialog agent.

SUMMARY

Principles of the invention provide techniques for multi-modal dialog agents representing a level of confidence in analysis. In one aspect, an exemplary method includes receiving a remark from a user; passing the remark to an intelligent system; receiving a response and a level of confidence from the intelligent system; and portraying the response to the user via an equivocal persona in case the level of confidence is less than a pre-determined threshold value.

In another aspect, an exemplary apparatus includes a memory embodying computer executable instructions; and at least one processor, coupled to the memory, and operative by the computer executable instructions. More specifically, the processor is operative by the computer executable instructions to facilitate receiving a remark from a user; passing the remark to an intelligent system; receiving a response and a level of confidence from the intelligent system; portraying the response to the user via an equivocal persona in case the level of confidence is less than a pre-determined threshold value; and portraying the response to the user via an authoritative persona in case the level of confidence equals or exceeds the pre-determined threshold value.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Intuitive portrayal of confidence level in an analytic result.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
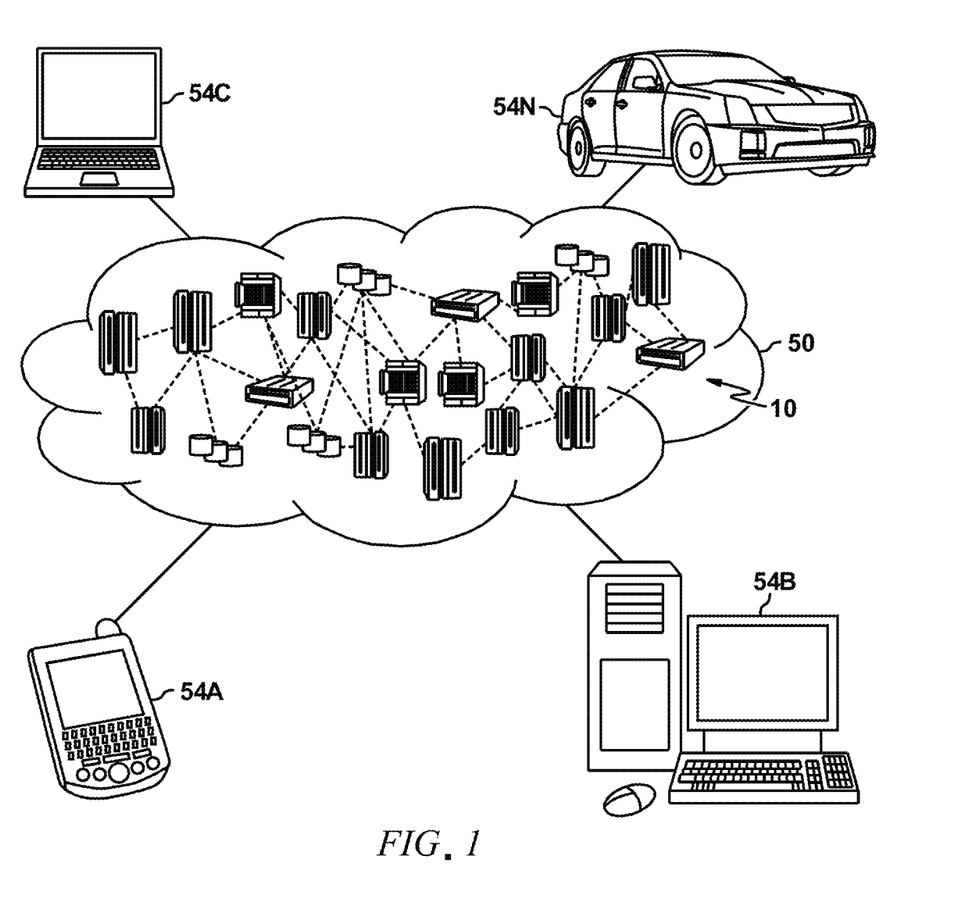
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
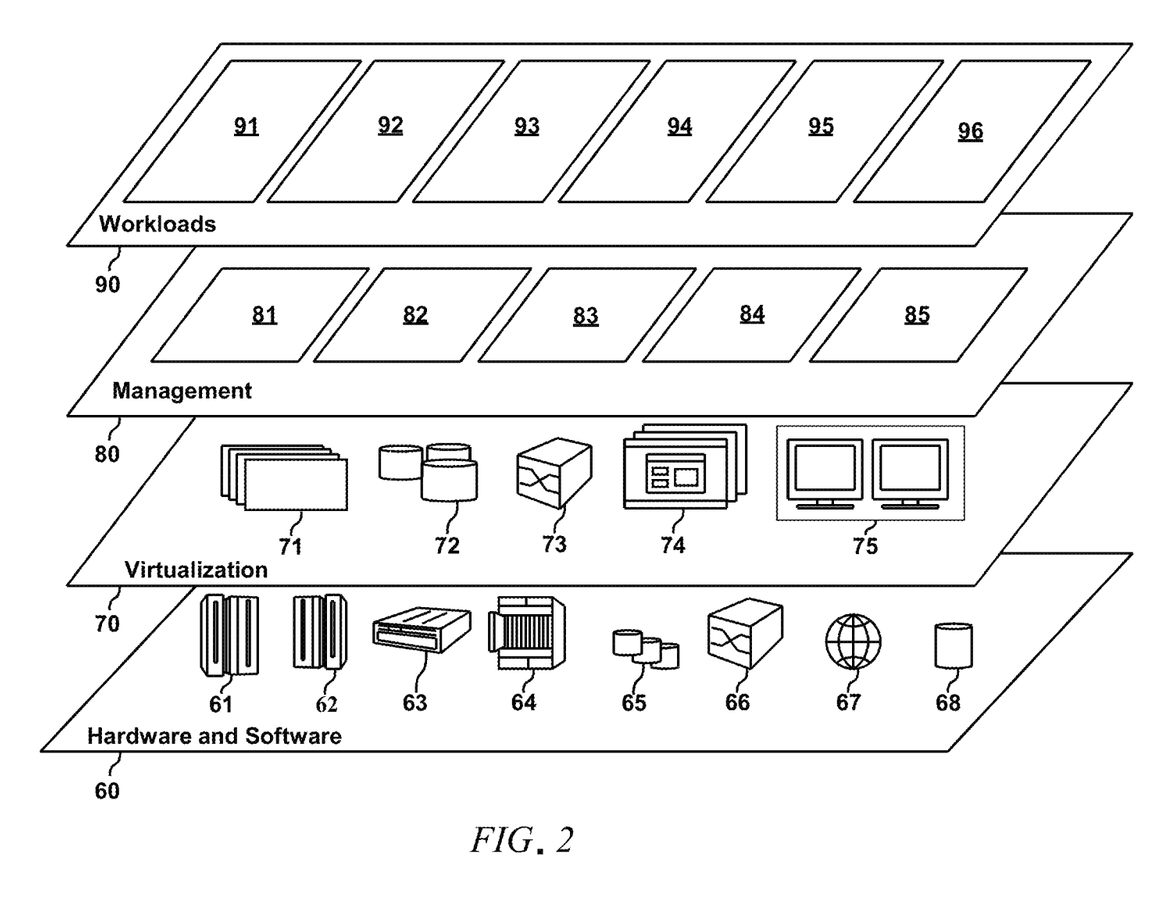
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a multi-modal dialog agent 96.

Conventionally, an intelligent system such as a cognitive neural network can be used to assess a set of data using rules inferred from training data, and to generate a response (usually a classification of the data) based on the assessment. A cognitive neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A cognitive neural network can implement supervised, unsupervised, or semi-supervised machine learning.

Once the intelligent system generates a response, an automated dialog agent then can be used to present the intelligent system's response. Typically, an automated dialog agent portrays a high level of confidence in the response so as to reassure users that the intelligent system is functioning adequately. However, this can be problematic when the system actually has a low level of confidence in its response (i.e. an "edge case" in classifying an image). One workaround to this problem is to explicitly state the intelligent system's level of confidence, either verbally or with a visual alert such as a text box. This workaround, however, is not completely satisfactory because it is difficult for any user to discern the difference between, e.g., a 51% level of confidence or a 49% level of confidence. A further workaround to this problem is to explicitly display a comparative indication of the intelligent system's confidence in a variety of possible responses, e.g., a bar graph that shows 40% confidence in the stated response, 30% confidence in a different response, and varying levels of confidence in several other potential responses. This further workaround, however, still is not completely satisfactory because it can engender uncertainty in the user as to whether any of the system responses are valid—even when the stated response is accurate.

It is particularly difficult for a user to interpret explicit statements of accuracy using mathematical concepts such as percentage confidence levels when the user is not mathematically sophisticated, for example if the user is a child. Additionally, non-binary or grayscale indications of confidence, such as a bar graph of confidence in a variety of possible responses, can be confusing to any user. What would be helpful is a binary indication of confidence, presented in a manner that makes sense to any user including a child, in a way that invites the user to provide feedback that might help the intelligent system learn.

Embodiments of the present invention provide a binary indication of confidence in the form of a multi-modal automated dialog agent that is designed with a split personality. When the intelligent system behind the dialog agent has a level of confidence greater than a threshold value, the multi-modal dialog agent presents the system's response using a reassuring, mature, and authoritative persona. On the other hand, when the intelligent system's level of confidence is less than the threshold value, the multi-modal dialog agent presents the system's response using an uncertain and inquisitive persona. Any user, including a child, can readily discern the differences between the two personae and can accord the system's response appropriate weight in decision-making based on which persona presents the response. Additionally, any user, including a child, can provide feedback to train the system in response to the inquisitive persona's direct request for feedback.

Figure 3:
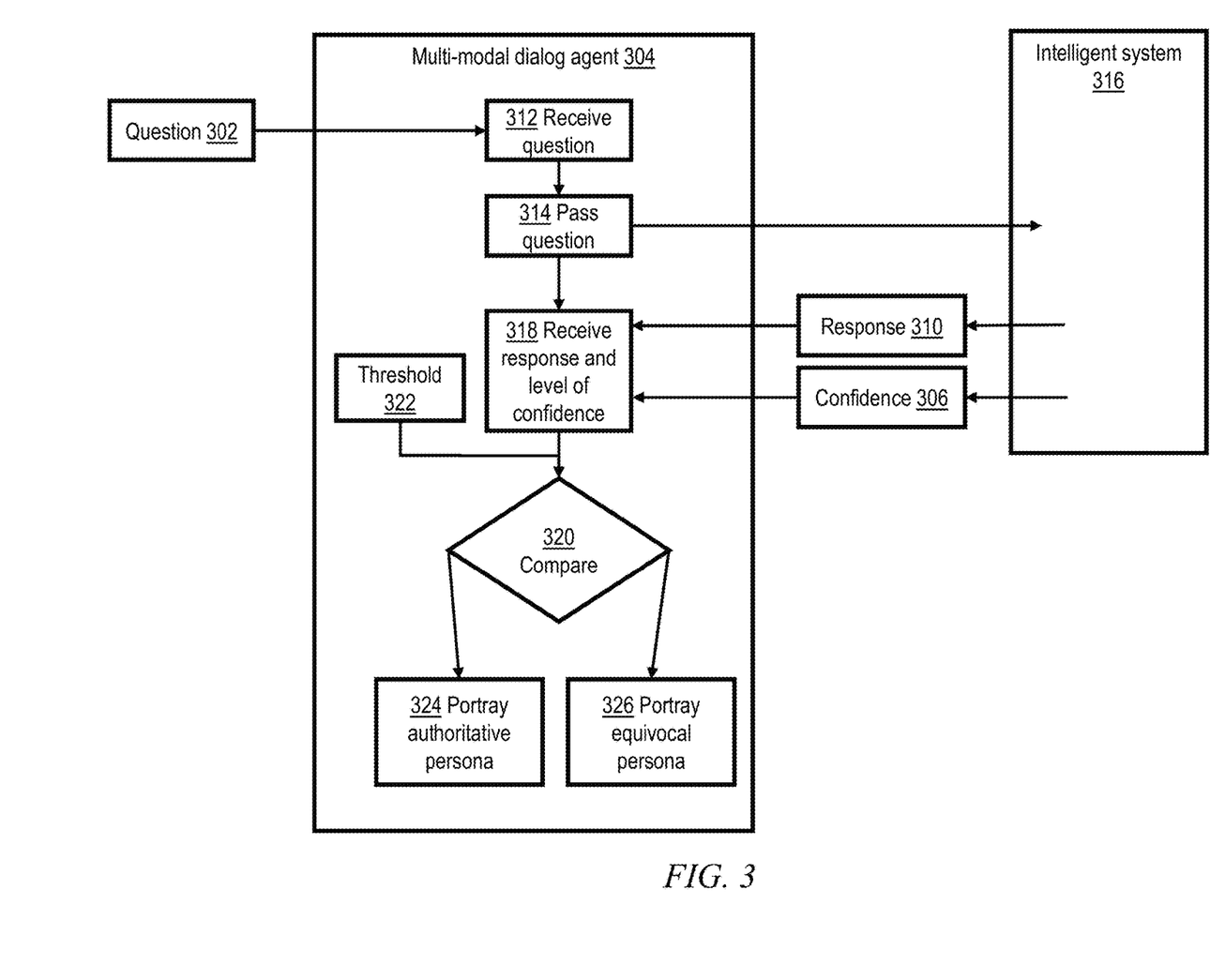
FIG. 3 depicts a method for responding to a question using a multi-modal dialog agent to represent a level of confidence in analysis underlying the response.

FIG. 3 depicts a method 300 for responding to a remark 302 using a multi-modal dialog agent 304 to represent a level of confidence 306 in the analysis 308 underlying a response 310. The remark 302 may be a question or a statement. At block 312 the multi-modal dialog agent 304 receives the remark 302, and at block 314 the multi-modal dialog agent 304 passes the question to an intelligent system 316. At block 318 the multi-modal dialog agent 304 receives the response 310 back from the intelligent system 316 along with the level of confidence 306. At block 320 the multi-modal dialog agent 304 compares the level of confidence 306 to a pre-determined threshold value 322. At block 324, when the level of confidence 306 exceeds the threshold value 322, the multi-modal dialog agent 304 portrays the response 310 using an authoritative persona. Otherwise, at block 326 the multi-modal dialog agent 304 portrays the response 310 using an equivocal, inquisitive persona.

Figure 4:
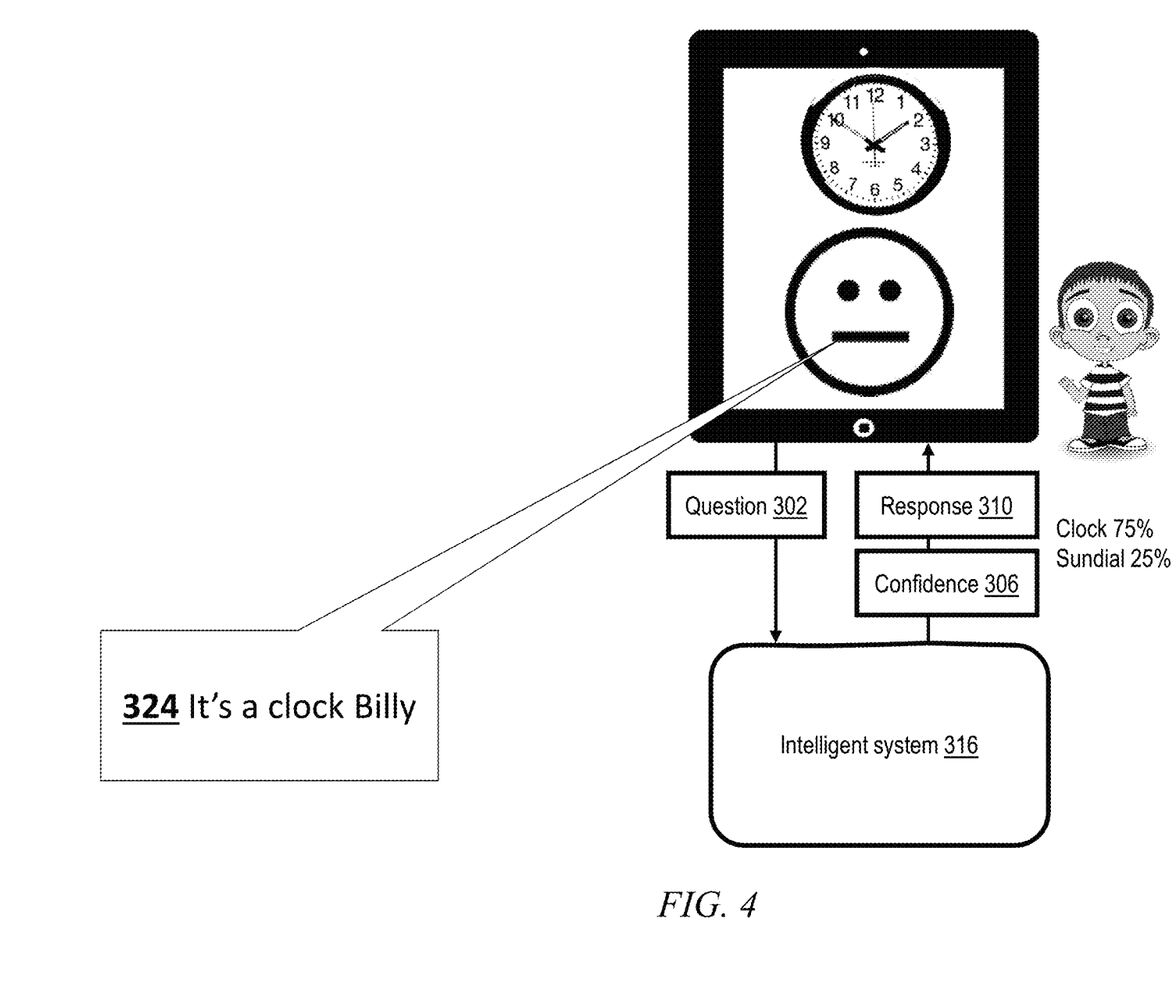
FIG. 4 depicts an exemplary multi-modal dialog agent presenting a high-confidence response with an authoritative persona.

For example, FIG. 4 depicts the multi-modal dialog agent 304 responding with a relatively high level of confidence using an authoritative persona. A user (e.g., a child) presents an image of a clock 400 to the multi-modal dialog agent 304 with the implicit question "What is this?" After passing the image to the intelligent system 316 (not shown in FIG. 4), the multi-modal dialog agent 304 obtains a response 402 with a high level of confidence ("clock 75% sundial 25%"). Accordingly, the multi-modal dialog agent 304 presents the response using an authoritative persona 404: "It's a clock, Billy!".

Figure 5:
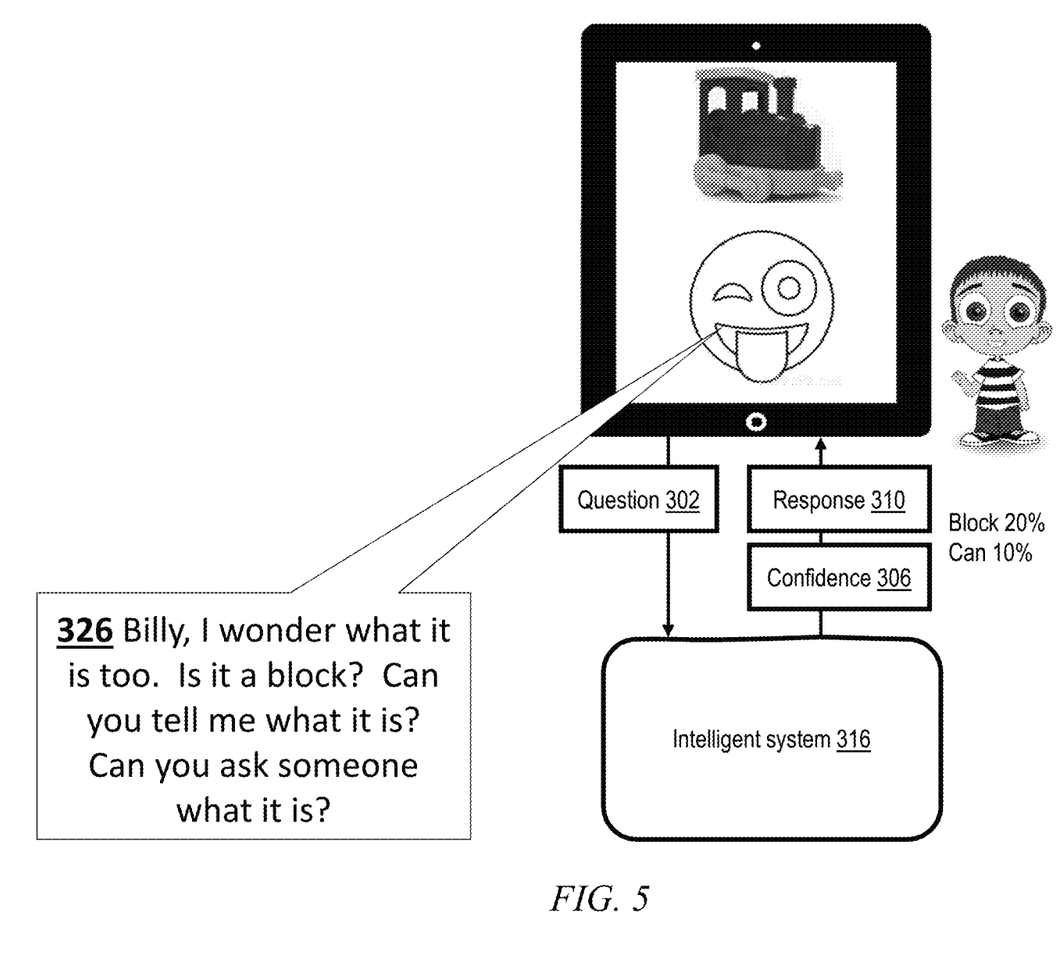
FIG. 5 depicts the multi-modal dialog agent presenting a low-confidence response with an equivocal persona.

On the other hand, FIG. 5 depicts the multi-modal dialog agent 304 responding with a relatively low level of confidence. In this instance, the user presents an image of a train 500 to the multi-modal dialog agent 304, again with the implicit question "What is this?" After passing the image to the intelligent system 316 (not shown in FIG. 5), the multi-modal dialog agent 304 obtains a response 502 with a low level of confidence ("block 20% can 10%"). Accordingly, the multi-modal dialog agent 304 presents the response using an equivocal persona 504: "Billy, I wonder what it is too. Is it a block? Can you tell me what it is? Can you ask someone what it is?" It should be understood that the multi-modal dialog agent 304 can output affected dialog, for example, using colloquial slang to impart further context (e.g., indicating a low or high confidence).

In both instances, the multi-modal dialog agent 304 monitors for user feedback on the accuracy of the response.

Figure 6:
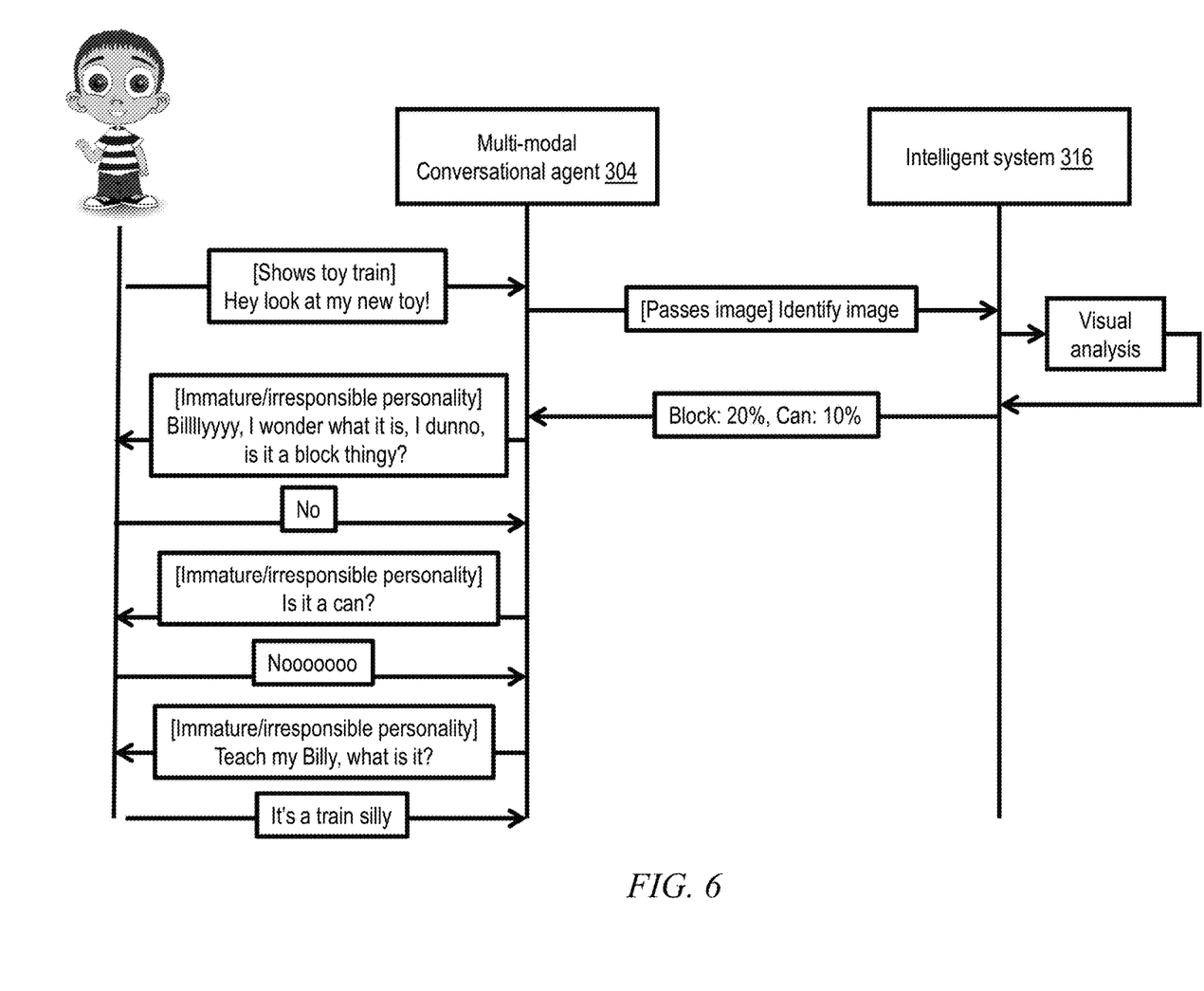
FIG. 6 depicts a data flow for the multi-modal dialog agent using the equivocal persona.

FIG. 6 depicts a data flow 600 for the multi-modal dialog agent 304 using the equivocal persona. At 312 the multi-modal dialog agent 304 receives the remark 302 from the user 602. At 314 the multi-modal dialog agent 304 passes the remark 302 to the intelligent system 316. The intelligent system 316 performs image analysis, then returns the response 310 at 318. At 326a, 326b, 326c the multi-modal dialog agent 304 interacts with the user 602 via the equivocal persona. For example, at 326*a* the multi-modal dialog agent 304 proposes a first classification of the image that was received as part of the remark 302. At 326*b* the multi-modal dialog agent 304 proposes a second classification of the image. At 326*c* the multi-modal dialog agent 304 asks the user 602 for the user's interpretation of the image.

Turning now to exemplary distinctions between an "authoritative" persona and an "equivocal" persona; the two personae use different vocabularies and intonations, as well as different visual representations. These differences will be apparent to one having ordinary skill in the art, for example, a worker proficient in the dialect used by the multi-modal dialog agent. In one exemplary embodiment, the authoritative persona uses first settings for vocabulary and voice, for example, an English language dialog agent would use a fact-focused vocabulary with a firm or assertive tone (e.g., generally level pitch with descending pitch for emphasis of key words) and speech style (e.g., formal grammar). In at least one exemplary embodiment, the authoritative persona is represented by a serious face, which can be an animation or a still frame. An exemplary serious face is shown in FIG. 4. In one exemplary embodiment, the equivocal persona uses second settings for vocabulary and voice, different than the first settings, for example, in the case of the English language dialog agent using a question-focused vocabulary with a sing-song tone (e.g., rapidly varying and generally rising pitch) and speech style (e.g., using "-y" and "-ish" endings, grammatical errors). In at least one exemplary embodiment, the equivocal persona is represented by a goofy face, which may be an animation or a still frame. An exemplary goofy face is shown in FIG. 5.

Given the discussion thus far, it will be appreciated that, in general terms, an exemplary method, according to an aspect of the invention, includes receiving a remark from a user; passing the remark to an intelligent system; receiving a response and a level of confidence from the intelligent system; and portraying the response to the user via an equivocal persona in case the level of confidence is less than a pre-determined threshold value. In one or more embodiments, the method also includes portraying the response to the user via an authoritative persona in case the level of confidence equals or exceeds the pre-determined threshold value. In one or more embodiments, the authoritative persona communicates using a fact-focused vocabulary. In one or more embodiments, the authoritative persona communicates with a firm tone. For example, the authoritative persona communicates with generally level pitch and descending pitch for emphasis of key words. In one or more embodiments, the authoritative persona communicates with formal grammar. In one or more embodiments, the equivocal persona communicates using a question-focused vocabulary. In one or more embodiments, the equivocal persona communicates with rapidly varying and generally rising pitch. In one or more embodiments, the equivocal persona communicates with grammatical errors.

An exemplary multi-modal dialog agent apparatus includes a memory embodying computer executable instructions; and at least one processor, coupled to the memory, and operative by the computer executable instructions. The processor is operative by the computer executable instructions to facilitate receiving a remark from a user; passing the remark to an intelligent system; receiving a response and a level of confidence from the intelligent system; portraying the response to the user via an equivocal persona in case the level of confidence is less than a pre-determined threshold value; and portraying the response to the user via an authoritative persona in case the level of confidence equals or exceeds the pre-determined threshold value. In one or more embodiments, the authoritative persona communicates using a fact-focused vocabulary. In one or more embodiments, the authoritative persona communicates with a firm tone. For example, the authoritative persona communicates with generally level pitch and descending pitch for emphasis of key words. In one or more embodiments, the authoritative persona communicates with formal grammar. In one or more embodiments, the equivocal persona communicates using a question-focused vocabulary. In one or more embodiments, the equivocal persona communicates with rapidly varying and generally rising pitch. In one or more embodiments, the equivocal persona communicates with grammatical errors.

An exemplary non-transitory computer readable medium embodies computer executable instructions which when executed by a computer cause the computer to facilitate receiving a remark from a user; passing the remark to an intelligent system; receiving a response and a level of confidence from the intelligent system; portraying the response to the user via an equivocal persona in case the level of confidence is less than a pre-determined threshold value; and portraying the response to the user via an authoritative persona in case the level of confidence equals or exceeds the pre-determined threshold value. In one or more embodiments, the authoritative persona communicates with generally level pitch and descending pitch for emphasis of key words. In one or more embodiments, the equivocal persona communicates with grammatical errors.

Figure 7:
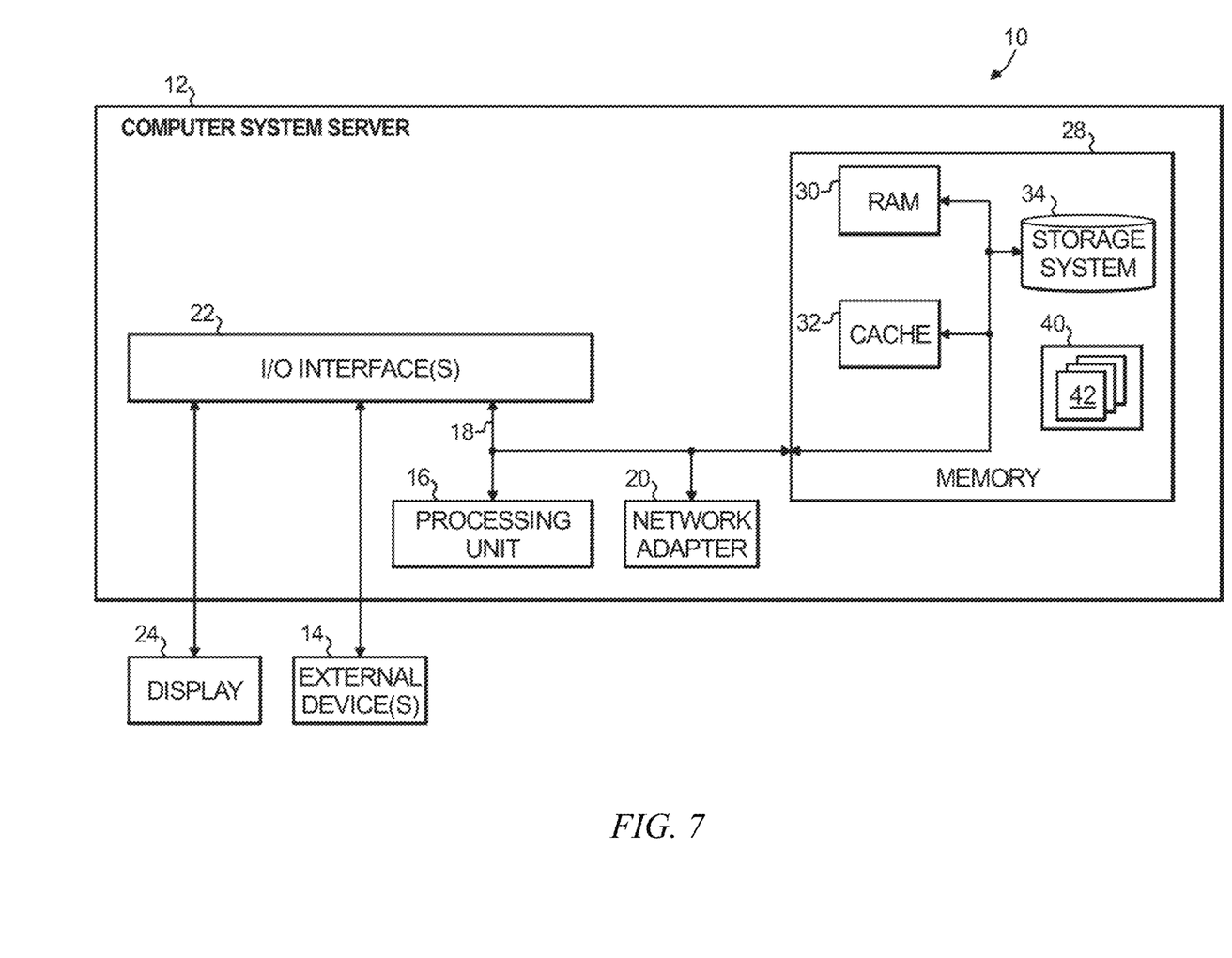
FIG. 7 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 7 depicts a computer system that may be useful in implementing one or more aspects and/or elements of the invention, also representative of a cloud computing node according to an embodiment of the present invention. Referring now to FIG. 7, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 7, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 7) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving a remark from a user via a multi-modal dialog agent, wherein the remark includes an image attachment;
   passing the remark from the multi-modal dialog agent to an intelligent system;
   in the intelligent system, generating a response to the remark based on image analysis of the image attachment and generating a level of confidence in the response;
   receiving the response and the level of confidence from the intelligent system at the multi-modal dialog agent;
   modifying the multi-modal dialog agent according to a persona selected from a set of personae in response to the level of confidence, wherein the set of personae includes an equivocal persona in case the level of confidence is less than a pre-determined threshold value and includes an authoritative persona in case the level of confidence equals or exceeds the pre-determined threshold value, wherein the authoritative persona has a first voice pattern and a first facial expression while the equivocal persona has a different second voice pattern and a different second facial expression, wherein the authoritative persona presents a single response option while the equivocal persona presents multiple response options;
   portraying the response to the user via the multi-modal dialog agent; and
   monitoring via the multi-modal dialog agent for user feedback on an accuracy of the response.

2. The method of claim 1 wherein the authoritative persona communicates using a fact-focused vocabulary.

3. The method of claim 1 wherein the authoritative persona communicates with a firm tone and a serious facial expression.

4. The method of claim 1 wherein the authoritative persona communicates with generally level pitch and descending pitch for emphasis of key words while maintaining eyebrows and mouth relaxed and generally horizontal.

5. The method of claim 1 wherein the authoritative persona communicates with formal grammar.

6. The method of claim 1 wherein the equivocal persona communicates using a question-focused vocabulary.

7. The method of claim 1 wherein the equivocal persona communicates with rapidly varying and generally rising pitch while squinting one eye and widening the other eye.

8. The method of claim 1 wherein the equivocal persona communicates with grammatical errors.

9. A multi-modal dialog agent apparatus comprising:
   a memory embodying computer executable instructions; and
   at least one processor, coupled to the memory, and operative by the computer executable instructions to facilitate:
   receiving a remark from a user via a multi-modal dialog agent, wherein the remark includes an image attachment;
   passing the remark from the multi-modal dialog agent to an intelligent system;
   in the intelligent system, generating a response to the remark based on image analysis of the image attachment and generating a level of confidence in the response;
   receiving the response and the level of confidence from the intelligent system at the multi-modal dialog agent;
   modifying the multi-modal dialog agent according to a persona selected from a set of personae in response to the level of confidence, wherein the set of personae includes an equivocal persona in case the level of confidence is less than a pre-determined threshold value and includes an authoritative persona in case the level of confidence equals or exceeds the pre-determined threshold value, wherein the authoritative persona has a first voice pattern and a first facial expression while the equivocal persona has a different second voice pattern and a different second facial expression, wherein the authoritative persona presents a single response option while the equivocal persona presents multiple response options;
   portraying the response to the user via the multi-modal dialog agent; and
   monitoring via the multi-modal dialog agent for user feedback on an accuracy of the response.

10. The apparatus of claim 9 wherein the authoritative persona communicates using a fact-focused vocabulary.

11. The apparatus of claim 9 wherein the authoritative persona communicates with a firm tone.

12. The apparatus of claim 9 wherein the authoritative persona communicates with generally level pitch and descending pitch for emphasis of key words.

13. The apparatus of claim 9 wherein the authoritative persona communicates with formal grammar.

14. The apparatus of claim 9 wherein the equivocal persona communicates using a question-focused vocabulary.

15. The apparatus of claim 9 wherein the equivocal persona communicates with rapidly varying and generally rising pitch.

16. The apparatus of claim 9 wherein the equivocal persona communicates with grammatical errors.

17. A non-transitory computer readable medium embodying computer executable instructions which when executed by a computer cause the computer to facilitate:

receiving a remark from a user via a multi-modal dialog agent, wherein the remark includes an image attachment;

passing the remark from the multi-modal dialog agent to an intelligent system;

in the intelligent system, generating a response to the remark based on image analysis of the image attachment and generating a level of confidence in the response;

receiving the response and the level of confidence from the intelligent system at the multi-modal dialog agent;

modifying the multi-modal dialog agent according to a persona selected from a set of personae in response to the level of confidence, wherein the set of personae includes an equivocal persona in case the level of confidence is less than a pre-determined threshold value and includes an authoritative persona in case the level of confidence equals or exceeds the pre-determined threshold value, wherein the authoritative persona has a first voice pattern and a first facial expression while the equivocal persona has a different second voice pattern and a different second facial expression, wherein the authoritative persona presents a single response option while the equivocal persona presents multiple response options;

portraying the response to the user via the multi-modal dialog agent; and monitoring via the multi-modal dialog agent for user feedback on an accuracy of the response.

18. The medium of claim 17 wherein the authoritative persona communicates with generally level pitch and descending pitch for emphasis of key words.

19. The medium of claim 17 wherein the equivocal persona communicates with grammatical errors.

\* \* \* \* \*